US006898653B2

(12) United States Patent
Su et al.

(10) Patent No.: US 6,898,653 B2
(45) Date of Patent: May 24, 2005

(54) PLUG-AND-PLAY INTERCONNECTION ARCHITECTURE AND METHOD WITH IN-DEVICE STORAGE MODULE IN PERIPHERAL DEVICE

(75) Inventors: Shih Chieh Su, Taipei (TW); Jia Lung Wang, Taipei (TW); Chih-Lung Lin, Taipei (TW); Hsiao-Te Chang, Taoyuan (TW)

(73) Assignee: Neodio Technologies Corporation, Taipei (TW)

( * ) Notice: Subject to any disclaimer, the term of this patent is extended or adjusted under 35 U.S.C. 154(b) by 324 days.

(21) Appl. No.: 10/334,761

(22) Filed: Dec. 30, 2002

(65) Prior Publication Data

US 2004/0128420 A1 Jul. 1, 2004

(51) Int. Cl.[7] .......................... G06F 13/10; G06F 13/38; G06F 3/00
(52) U.S. Cl. .......................... 710/302; 710/16; 710/313; 709/227; 713/1
(58) Field of Search .............................. 710/302, 2, 16, 710/313, 62; 709/227, 250, 203, 220; 713/1, 100; 370/254

(56) References Cited

U.S. PATENT DOCUMENTS 6,032,201 A * 2/2000 Tillery et al. .................. 710/8

6,263,387 B1 * 7/2001 Chrabaszcz ................. 710/302
6,789,111 B1 * 9/2004 Brockway et al. .......... 709/222

OTHER PUBLICATIONS

"A plug and play approach to data acquisition" by J. Toledo et al. (abstract only).*
"Pitfalls of Plug & Play" by Spinner, R. (abstract only) Publication Date: Aug. 30–Sep. 2, 1999.*

* cited by examiner

Primary Examiner—Gopal C. Ray
(74) Attorney, Agent, or Firm—Mikio Ishimaru

(57) ABSTRACT

A plug-and-play(PnP) interconnection architecture and method with an in-device storage module in a peripheral device are proposed for interconnecting a peripheral device with a host computer unit. The proposed architecture is characterized by integration of an in-device storage unit with internal functional modules of the peripheral device for storing device specific data and software such as the dedicated device driver of the peripheral device. An enhanced plug-and-play (ePnP) layered structure is proposed based on the in-device storage architecture. The ePnP provides a mechanism to PnP peripheral devices' functions customization. An application of the ePnP is the mechanism to bring up the device driver automatically when the peripheral device is connected to the host computer unit. This auto-installation mechanism provides a truly plug-and-play capability to the user.

24 Claims, 4 Drawing Sheets

PLUG-AND-PLAY INTERCONNECTION ARCHITECTURE AND METHOD WITH IN-DEVICE STORAGE MODULE IN PERIPHERAL DEVICE

BACKGROUND OF THE INVENTION

1. Field of the Invention

This invention relates to computer peripheral technology, and more particularly, to a plug-and-play interconnection architecture and method with an in-device storage module in a peripheral device, which is designed for use to interconnect a peripheral device with a host computer unit without requiring user-operated installation of a device driver of the peripheral device.

2. Description of Related Art

Plug-and-play (PnP) is peripheral device linking technology that allows a user to interconnect a peripheral device, such as monitor, modem, printer, keyboard, pointing device, external storage device and so on, with a host computer unit, such as PC (personal computer) unit, workstation or server, without having to manually configure the computer's internal settings, i.e., BIOS settings including IRQ (interrupt request), DMA (direct memory access), and I/O and memory addresses. As the term implies, the user can "plug" a peripheral device to a PC unit and then "play" it instantly without having to manually configure the PC's internal BIOS settings. Due to this feature, a user who is unfamiliar with PC's BIOS settings can nevertheless install new peripheral devices to his/her PC unit successfully.

Conventional plug-and-play interconnection architectures, however, still have several drawbacks. Firstly, the user is still required to manually install the device driver of the plugged peripheral device on the host computer unit, which is quite time-consuming and still makes the technology hardly deserve the name of "plug and play". Secondly, since the device driver and related product information are typically packed in floppy disks or CD/DVD discs, it would require more labor and cost on the manufacturer side to produce, which would make the production of computer peripheral devices quite laborious and thus cost-ineffective. Thirdly, for the host computer unit to recognize the PnP peripheral device, corresponding PnP configuration data of the peripheral device need to be centralized and stored in the host computer unit. This makes the host computer unit maintain a huge PnP-device database, which may be considered as a bottleneck for applications of PnP peripheral devices.

SUMMARY OF THE INVENTION

It is a primary objective of this invention to provide a plug-and-play (PnP) interconnection architecture for PnP-compliant peripheral devices with in-device storage, so as to allow the peripheral device to be readily accessible by a host system or a host computer unit. The PnP interconnection architecture comprises: a host-side module installed on the host computer unit; and a peripheral-side module installed on the peripheral device. The peripheral-side module includes a communication interface for linking internal functional modules of the peripheral device to the host computer unit; an in-device storage unit coupled to the communication interface and at least used for storing data relating to the peripheral device; and a peripheral function unit coupled to the communication interface, for storing data relating to a hardware architecture and firmware for the peripheral device. The host-side module includes a communication interface linked to the communication interface of the peripheral-side module installed on the peripheral device; and a software platform that supports PnP devices, the software platform being coupled to the communication interface and capable of performing a PnP-compliant auto-configuration procedure and a device-driver setup procedure. By the above PnP interconnection architecture, as the peripheral device is linked via the communication interfaces to the host computer unit, the software platform is activated to perform a PnP-compliant auto-configuration procedure to configure the host computer unit for interconnection with the peripheral device; and then, if a device driver of the peripheral device is not installed on the host computer unit, a device-driver setup procedure is performed to download and set up a device driver pre-stored in the in-device storage unit into the host computer unit.

In particular, the PnP interconnection architecture according to the invention improves over a conventional conceptual PnP layered structure by an in-device storage architecture composed of an in-device function unit and an in-device storage unit respectively associated with a PnP-compliant function layer and a PnP-compliant logical layer for the conventional PnP layered structure, to thereby providing a customarily named enhanced PnP (ePnP) layered structure. This ePnP layered structure allows PnP-compliant peripheral devices to self-perform device customization functions. A typical application of the ePnP layered structure is presented as auto-installation of a device driver for the peripheral device. In other words, the ePnP layered structure makes the host computer unit check if a device driver for the peripheral device is already installed therein; in the case of the device driver being absent, the host computer unit is urged to install the device driver from the peripheral device, so as to realize the "plug and play" mechanism. In addition, the in-device storage unit can be used to store device specific software, utilities, documents, images and videos that may enhance functions and performances of the peripheral device.

BRIEF DESCRIPTION OF DRAWINGS

The present invention can be more fully understood by reading the following detailed description of the preferred embodiments, with reference made to the accompanying drawings, wherein.

DETAILED DESCRIPTION OF PREFERRED EMBODIMENTS

The plug-and-play (PnP) interconnection architecture and method according to the invention are disclosed in full details by way of preferred embodiments in the following with reference to FIG. 1 to FIG. 4.

Figure 1:
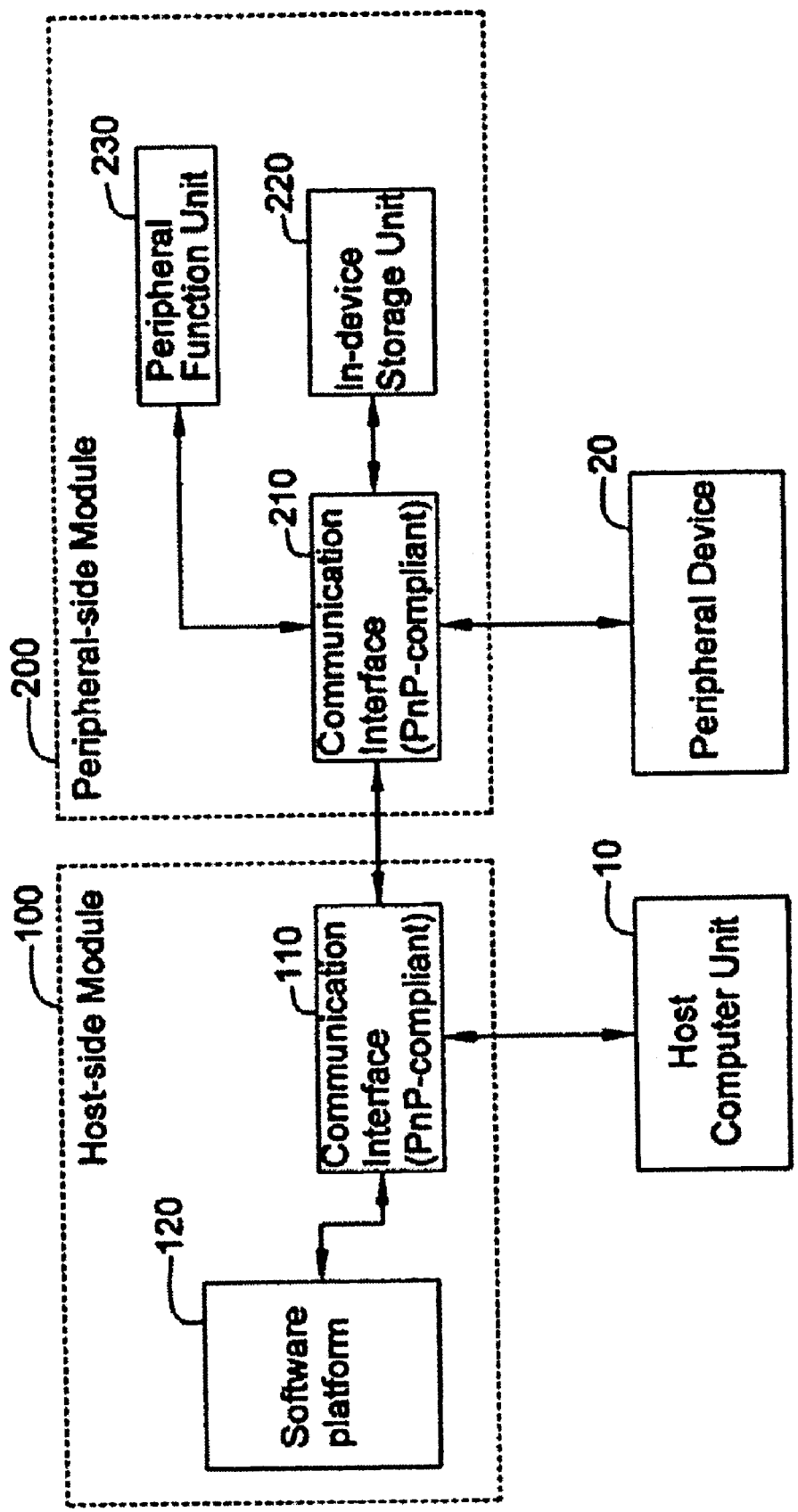
FIG. 1 is a schematic diagram showing a conceptual model of a plug-and-play (PnP) interconnection architecture with an in-device storage module in a peripheral device according to the invention.

FIG. 1 illustrates a conceptual model of the plug-and-play interconnection architecture with an in-device storage module in a peripheral device according to the invention. As shown in the drawing, the plug-and-play interconnection architecture of the invention is used to interconnect a peripheral device 20 with a host computer unit 10.

The host computer unit 10 can be, for example, a PC (personal computer) unit, a workstation, or a server; to name just a few; while the peripheral device 20 can be, for example, an image-input device (scanner, digital still camera, video camera, etc.), a telecommunication device (fax, modem, cable modem, xDSL modem, router, etc.), an external storage device (ZIP, microdrive, LS-120, various type of flash memory card as CF, SM, MMC, SD, MS, PCMCIA, XD, etc., floppy disk drive, thumb disk drive, hard disk CD/DVD, RW-CD/DVD, etc.), a human interface device (HID, e.g. keyboard, mouse, joystick, etc.), an audio input/output device (speaker, headset, etc.), or a printer; to just name a few.

The plug-and-play interconnection architecture according to the invention comprises two main modules: a host-side module 100 and a peripheral-side module 200, wherein the host-side module 100 is installed on the host computer unit 10, while the peripheral-side module 200 is installed on the peripheral device 20.

The host-side module 100 installed on the host computer unit 10 includes: a communication interface 110, and a software platform 120 that supports PnP devices. The peripheral-side module 200 installed on the peripheral device 20 includes: a communication interface 210, an in-device storage unit 220 and a peripheral function unit 230.

The communication interface 110 of the host-side module 100 is connected with the communication interface 210 on the peripheral-side module 200, and each of which is PnP-compliant and selected from the group consisting of USB interface, IEEE-1394 interface, PCMCIA interface, CardBus IO interface, Compact Flash interface, Secure Digit IO interface, and Memory Stick IO interface; to name just a few. These two communication interfaces, 110, 210 together are used to establish data communication linkage between the peripheral device 20 and the host computer unit 10.

The software platform 120 on the host-side module 100 is used to provide a PnP-compliant function for the communication interface 110, operational system for the host computer unit 10, etc. External software e.g. application program or device driver from the peripheral-side module 200 can be optionally installed on the software platform 120 for facilitating operation of the peripheral device 20 mounted with the peripheral-side module 200. The software platform 120 is capable of performing a PnP-compliant auto-configuration procedure and a device-driver setup procedure.

The peripheral function unit 230 includes a hardware architecture of the peripheral device 20 such as a physical structure for scanning functions, and a firmware program for driving the hardware architecture to operate. The in-device storage unit 220 of the peripheral-side module 200 installed on the peripheral device 20 is a characteristic feature of the invention, which is coupled to the communication interface 210 for data communication with the host-side module 100 installed on the host computer unit 10, and which is used to store device specific software and utilities such as application program, dedicated device driver (PnP-compliant) for the peripheral device 20, online manual, user guide, advertising image and video, and so on. Moreover, the in-device storage unit 220 may further be capable of providing device specific functions of the peripheral device 20 such as scanning, printing, etc. This in-device storage unit 220 can be any type of storage device, such as an optical disc selected from the group consisting of CD-ROM, CD-RW, DVD-ROM, DVD-RAM, DVD-RW, and DVD+RW, to name just a few; or a non-volatile memory device e.g. flash memory, EEPROM, EPROM, ROM, SDRAM or HD, to name just a few. In the case of the peripheral device being an external storage device, the in-device storage unit 220 can be implemented, for example, as a logical partition of the external storage device or a physically separated storage device.

Figure 2:
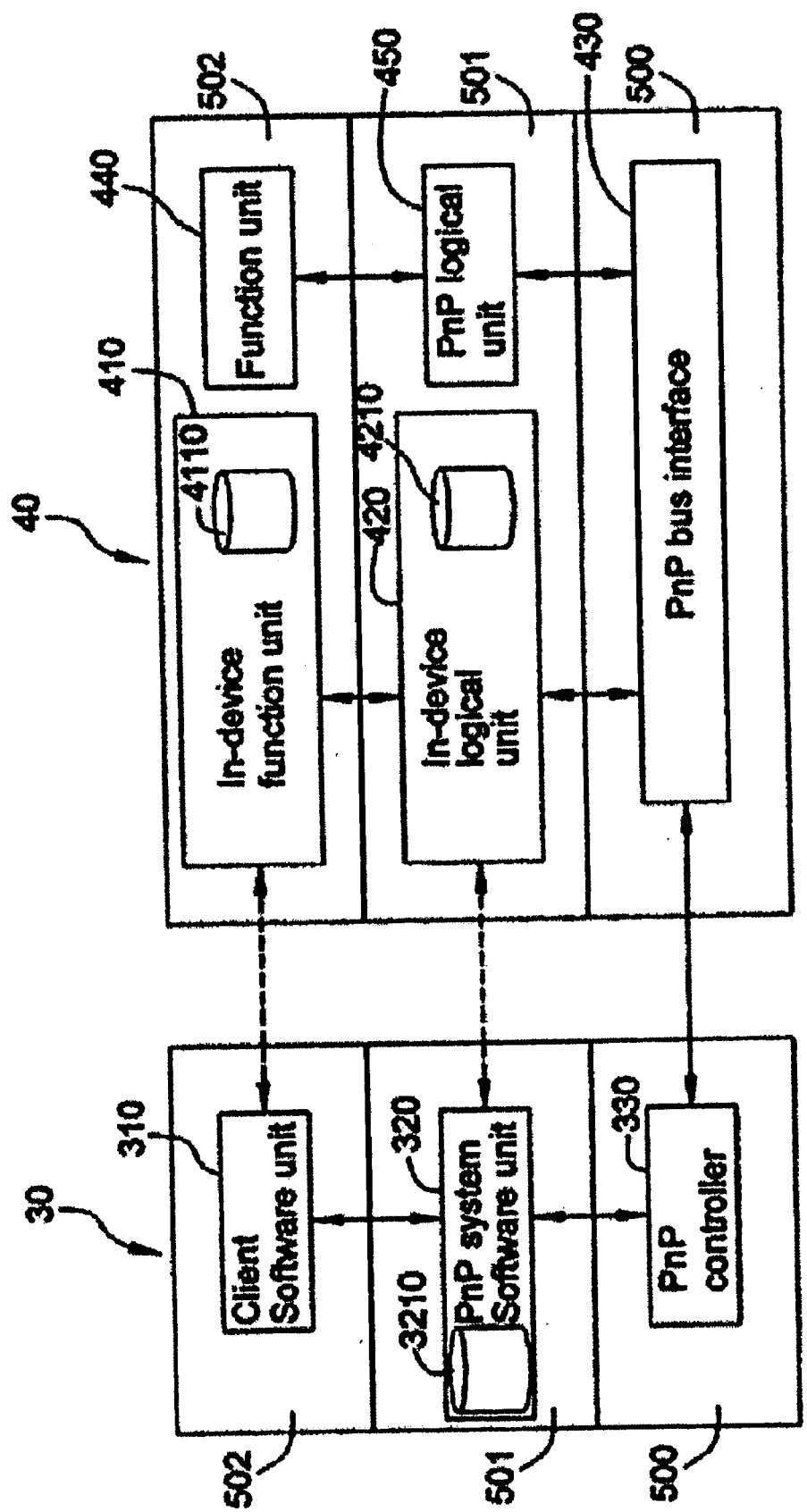
FIG. 2 is a schematic diagram showing a conceptual model of an enhanced PnP (ePnP) layered structure in association with an in-device storage architecture.

FIG. 2 illustrates a conceptual model of an enhanced PnP layered structure for the PnP interconnection architecture according to the invention. The PnP interconnection architecture improves over a conventional conceptual PnP layered structure by an in-device storage architecture composed of an in-device function unit and an in-device storage unit, to thereby providing a customarily named enhanced PnP (ePnP) layered structure. Referring to FIG. 1 and FIG. 2, a communication interface architecture 30 of the host computer unit 10 and a communication interface architecture 40 of the peripheral device 20 are each conceptually divided into a PnP-compliant physical layer 500, a PnP-compliant logical layer 501 and a PnP-compliant function layer 502.

In respect of the communication interface architecture 30 for the host computer unit 10, the PnP-compliant physical layer 500 has a PnP controller 330. The PnP-compliant logical layer 501 has a PnP system software unit 320 and a basic PnP database 3210, wherein the basic PnP database 3210 stores the basic device configuration data for PnP-compliant storage devices, and the PnP system software unit 320 reads data from the basic PnP database 3210, making the host computer unit 10 realize there is a PnP-compliant storage device (the in-device storage unit 220 in PnP peripheral devices 20) connected to the PnP communication interface 110. The host computer unit 10 therefore can access the PnP device configuration data of the PnP peripheral device and determine the type of peripheral device 20 (such as scanner, digital camera, etc) connected thereto via the PnP-compliant communication interface 110. The PnP-compliant function layer 502 has a client software unit 310. In particular, the PnP controller 330 of the PnP-compliant physical layer 500 is installed in the communication interface 110 of the host computer unit 10, and the PnP system software unit 320, basic PnP database 3210 and client software unit 310 are installed in the software platform 120 of the host computer unit 10. 120 of the host computer unit 10.

Moreover, for the communication interface architecture 40 of the peripheral device 20, the PnP-compliant physical layer 500 has a PnP bus interface 430 installed in the communication interface 210 of the peripheral device 20. The PnP-compliant logical layer 501 has an in-device logical unit 420 and a PnP logical unit 450, wherein the in-device logical unit 420 and PnP logical unit 450 are respectively connected to the PnP bus interface 430, and the in-device logical unit 420 is internally provided with device PnP data 4210 for storing storage device configuration data and device specific software that allows the in-device logical unit 420 to be communicated with the PnP bus interface 430. The PnP-compliant function layer 502 has an in-device function unit 410 and a function unit 440, wherein the in-device function unit 410 and function unit 440 are respectively connected to the in-device logical unit 420 and PnP logical unit 450. The in-device function unit 410 is formed with device PnP data 4110 for storing PnP storage device configuration data and device specific software that allows the in-device function unit 410 and function unit 440 of the PnP-compliant function layer 502 to communicate with the in-device logical unit 420 and PnP logical unit 450 of the PnP-compliant logical layer 501. It is to be noted that the PnP device configuration data 4210 and 4110 are the same, and they can be put either in the in-device logical unit 420 or in the in-device function unit 410. The in-device function unit 410 and in-device logical unit 420 are installed in the in-device storage unit 220 of the peripheral device 20, and the function unit 440 and PnP logical unit 450 are installed in the peripheral function unit 230 of the peripheral device 20.

As shown in FIG. 2, dotted lines illustrate virtual interconnection between the PnP-compliant logical layers 501 and between the PnP-compliant function layers 502 of the communication interface architectures 30, 40 respective for the host computer unit 10 and peripheral device 20, while a solid line represents physical interconnection between the PnP-compliant physical layers 500 thereof. This indicates that the PnP-compliant logical layer 501 and PnP-compliant function layer 502 on one side (host computer unit 10 or peripheral device 20) perform communication and data transfer through the PnP-compliant physical layer 500 via physical connection to corresponding layers of the other side. In particular, the peripheral device 20 communicates with the host computer unit 10 via physical interconnection of the PnP-compliant physical layers 500 thereof, and data transfer between the PnP-compliant logical layers 501 and PnP-compliant function layers 502 is accomplished by internally constructed units thereof via the PnP-compliant physical layers 500. As a result, when data are transferred via the PnP-compliant physical layers 500 from one side to the other side, the receiver side may prompt internally constructed units of the PnP-compliant logical and function layers 501, 502 to determine the source from which data are transferred.

Therefore, as shown in FIG. 2, the plug-and-play interconnection architecture according to the invention provides an ePnP layered structure in which data 4110, 4210 are respectively built in the PnP-compliant logical layer 501 and PnP-compliant function layer 502 of the communication interface architecture 40 for the peripheral device 20, for storing the PnP storage device configuration data of the peripheral device and device specific programs provided by the device manufacturer. This makes the database 3210 in the PnP-compliant logical layer 501 of the communication interface architecture 30 for the host computer unit 10 not necessarily store device configuration data and device specific software for peripheral devices. In particular, this database 3210 is used to store basic data for PnP-compliant storage device, so as to allow the host computer unit 10 to determine if the peripheral device 20 connected thereto is a storage device such as CD-ROM. Compared to a conventional PnP layered structure without an in-device storage architecture, the enhanced plug-and-play interconnection architecture according to the invention makes the host computer unit 10 not have to install all the PnP device configuration data of the peripheral device 20 in the host computer unit 10, and the device manufacturer can thereby provide great flexibility in types of PnP peripheral devices capable of operating in association with the host computer unit 10. Operation and data communication between the PnP peripheral device 20 and the host computer unit 10 are described in more details with reference to FIG. 3 and FIG. 4 as follows.

Figure 3:
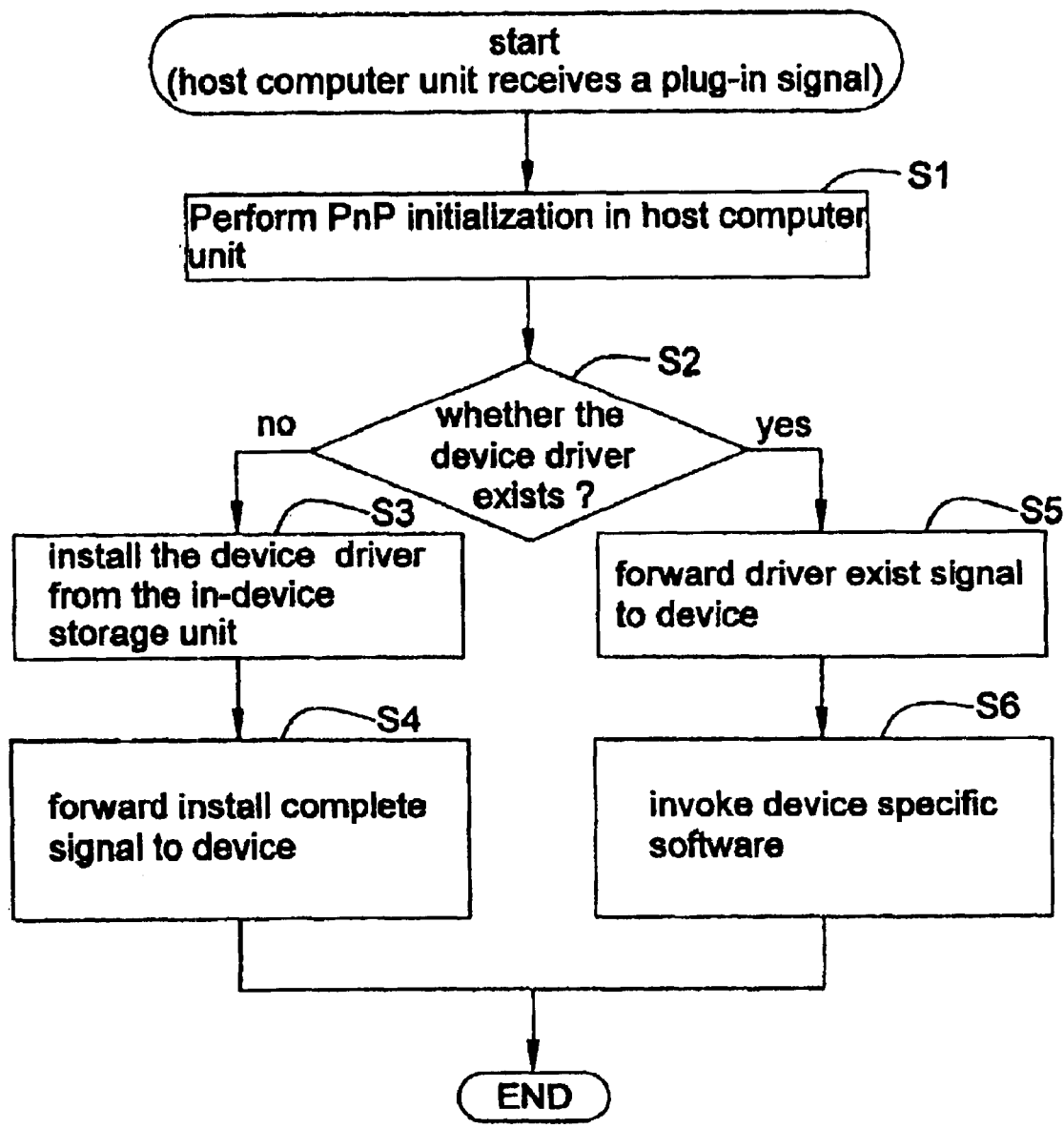
FIG. 3 is a flow diagram showing procedural steps performed by a host-side module of the plug-and-play interconnection architecture through the use of a plug-and-play interconnection method according to the invention.
Figure 4:
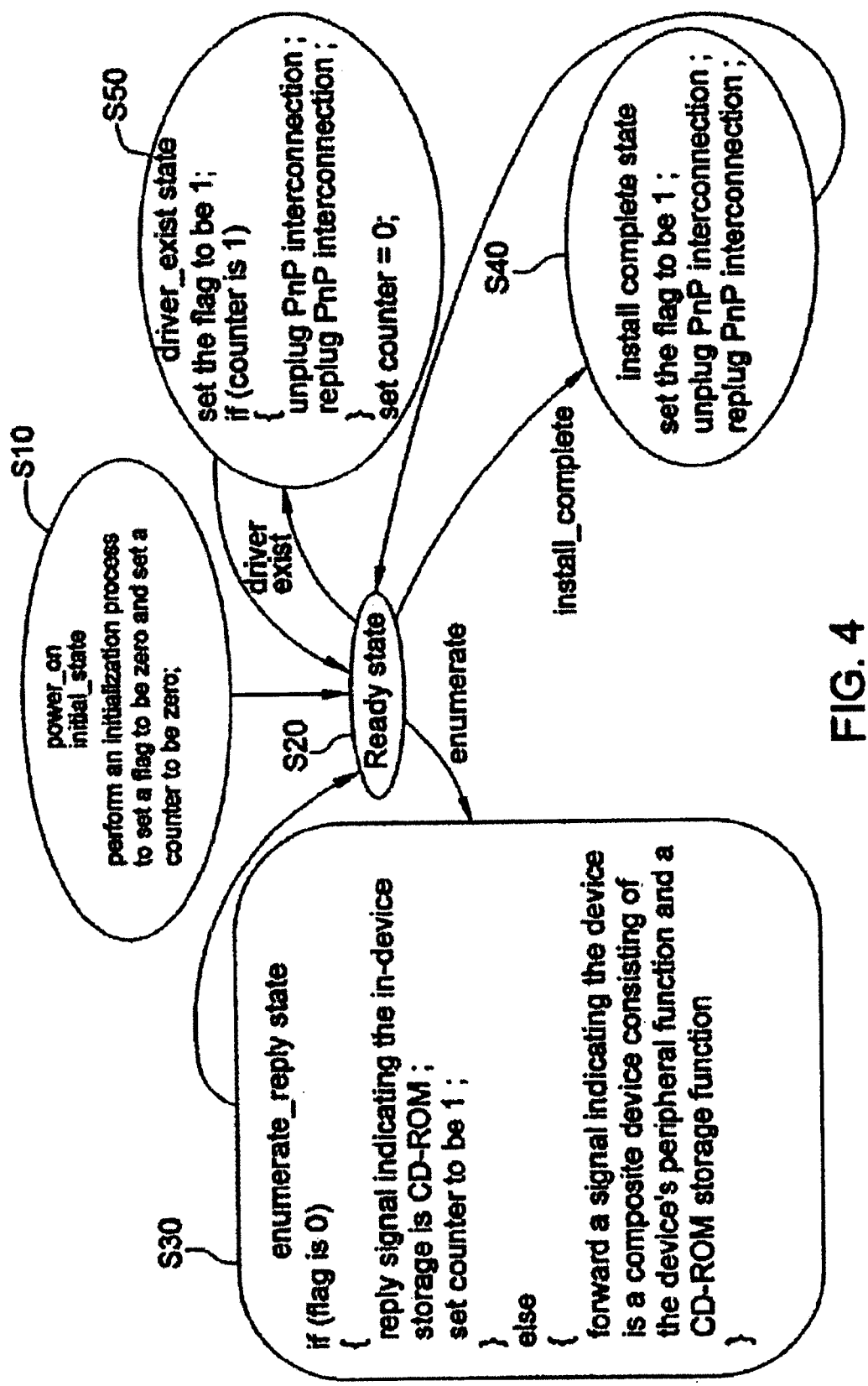
FIG. 4 is a state diagram showing procedural steps performed by a peripheral-side module of the plug-and-play interconnection architecture through the use of the plug-and-play interconnection method according to the invention.

An application of the plug-and-play interconnection architecture with the ePnP layered structure according to the invention is shown in FIG. 3 and FIG. 4; FIG. 3 illustrates procedural steps performed by the host-side module of the plug-and-play interconnection architecture according to the invention for functionally interconnecting the peripheral device with the host computer unit; and FIG. 4 illustrates procedural states performed by the peripheral-side module for device-host interconnection. The procedure of FIG. 3 is activated to start upon plugging of the peripheral device 20 to the host computer unit 10 by means of an Auto-Run or AutoPlay mechanism; for example, the communication interface 210 on the peripheral-side module 200 is connected to the communication interface 110 on the host-side module 100 by plugging a PnP cable (not shown) to both sides.

As shown in FIG. 3, when the peripheral device 20 is connected to or plugged in the host computer unit 10, the communication interface 110 receives a plug-in signal and performs a detection process. First, in step S1, the host computer unit 10 implements a PnP initialization process; in particular, the host computer unit 10 is adapted to be PnP-compliant via the communication interface 110 by means of a PnP-compliant function provided from the software platform 120.

In step S2, the host computer unit 10 determines if the device driver of the plugged peripheral device 20 is already installed therein. If yes, step S5 is performed; if no, step S3 proceeds.

In step S3, if no device driver for the peripheral device 20 is detected, a device driver installation program stored in the in-device storage unit 220 of the peripheral device 20 is activated to install the device driver for the peripheral device 20 from the in-device storage unit 220 to the host computer unit 10. Then, step S4 is performed.

In step S4, after completing installation of the device driver, the host computer unit 10 forwards an install-complete signal indicating complete installation of the device driver to the peripheral device 20 for its further processing.

In step S5, the host computer unit 10 sends a driver-exist signal indicating existence of the device driver for the peripheral device 20 via the communication interface 110 to the peripheral device 20. Then, step S6 is performed.

In step S6, the device specific software is invoked from the in-device storage unit 220 for executing particular or predetermined device specific functions. Therefore, customization of the peripheral device 20 can be performed by the device specific functions; typical customization is for example, auto-invocation of encryption programs for a USB card reader.

As shown in FIG. 4, which illustrates procedural states performed by the peripheral-side module. It is to be noted that FIG. 3 and FIG. 4 only show the states relating to this invention, not covering all the PnP procedural steps and states. In the case of the peripheral device 20 being electrically connected with the host computer unit 10, or power being supplied to the peripheral device 20, first, in state S10, when the peripheral device 20 is in a power-on and initial state, an initialization process is performed to set a flag of the peripheral device 20 as zero and set a counter thereof as zero. Then, it proceeds to state S20. In this embodiment, the flag of the peripheral device 20 can be alternatively zero or 1 indicating whether the peripheral device 20 receives a driver-exist signal from the host computer unit 10 or not; if yes, the flag is 1, or otherwise, the flag is zero. The counter is a flag used to smooth the control flow of the device state diagram when the device driver exists during the plug-in process.

After power-on or plug-in self-initialization, the peripheral device 20 is subject to a ready state S20, as shown in FIG. 4. At this stage, the peripheral device 20 waits for a signal transmitted from the host computer unit 10. In this embodiment, related types of signals from the host computer unit 10 include PnP enumerate signal, driver-exist signal and install-complete signal.

During plugged-in, a PnP software in host computer unit 10 sends an enumerate signal to the peripheral device 20. Once receiving a PnP enumerate signal from the host computer unit 10, it proceeds to state S30. It determines if the flag of the peripheral device 20 is zero; if yes, it indicates the device driver does not exist in the host computer unit 10; if no, it indicates the device driver exists in the host computer unit 10. If the flag is zero, the peripheral device 20 replies to the host computer unit 10 a signal indicating that the in-device storage unit 220 is a CD-ROM device, and then sets the counter thereof to be 1. Thereafter, the peripheral device 20 returns to state S20 (Ready state) and waits for further signaling from the host computer unit 10. If the flag is 1 and the device driver is already installed in the host computer unit 10, the peripheral device 20 replies to the host computer unit 10 a signal indicating the peripheral device 20 being a composite device consisting of the device's peripheral function unit 230 and a CD-ROM storage indicating the in-device storage unit 220. Then, the peripheral device 20 returns to state S20 (Ready state) and waits for further signaling from the host computer unit 10.

In state S20, when the peripheral device 20 receives an install-complete signal from the host computer unit 10, it proceeds to state S40. The peripheral device 20 sets the flag thereof to be 1, and in turn unplugs and then re-plugs the PnP interconnection with respect to the host computer unit 10 so as to enable plug-out and plug-in actions to the host side. As a result, the host computer unit 10 re-initiates the plug-in initialization process shown in FIG. 3. After state S40, the peripheral device 20 returns to state S20 (Ready state) and waits for further signaling from the host computer unit 10.

In state S20, when the peripheral device 20 receives a driver-exist signal from the host computer unit 10, it proceeds to state S50 in which the flag of the peripheral device 20 is set to be 1, and in the case of the counter being equal to 1, the peripheral device 20 unplugs and then re-plugs the PnP interconnection with respect to the host computer unit 10 so as to enable plug-out and plug-in actions in the host side; then, the counter is set to be zero. After state S50, the peripheral device 20 returns to state S20 (Ready state) and waits for further signaling from the host computer unit 10.

The plug-and-play interconnection architecture with an in-device storage module in a peripheral device according to the invention involves interaction between the peripheral device 20 and the host computer unit 10 via plug-and-play communication interfaces 210, 110 for allowing signal transmission and corresponding responses between the two sides. In particular, when the peripheral device 20 is connected to the host computer unit 10, the host computer unit 10 generates a plug-in signal that triggers the host computer unit 10 to perform PnP initialization via the software platform 120 of the host-side module 100. In the mean-time, the peripheral device 20 also performs initialization for the PnP device driver stored in the in-device storage unit 220 in a manner as to setup PnP communication between the host computer unit 10 and the peripheral device 20 via the PnP-compliant communication interfaces 110, 210. Therefore, by the procedural steps shown in FIG. 3 and FIG. 4, the peripheral device 20 would be activated even though the device driver thereof is not installed in the software platform 120 of the host-side module 100.

In conclusion, the invention provides a plug-and-play interconnection architecture for interconnecting a peripheral device with a host computer unit, which is characterized by integration of an in-device storage unit on the peripheral device for the purpose of storing various device specific software and utilities including a dedicated device driver for the peripheral device, device specific functions, etc. A mechanism built upon the proposed interconnection architecture is also provided, which allows the device driver of the peripheral device to be automatically activated when the peripheral device is connected to the host computer unit, and allows the peripheral device to operate without requiring a user to perform host system configuration and driver installation. The plug-and-play interconnection architecture of the invention therefore enables the user to instantly use the peripheral device, providing a truly plug-and-play capability to the user. Moreover, the invention enables the manufacturer to supply device drivers and device specific software without having to use separate floppy disks or optical discs, thereby making the production more cost-effective to implement.

The invention has been described using exemplary preferred embodiments. However, it is to be understood that the scope of the invention is not limited to the disclosed embodiments. On the contrary, it is intended to cover various modifications and similar arrangements. The scope of the claims, therefore, should be accorded the broadest interpretation so as to encompass all such modifications and similar arrangements.

What is claimed is:

1. A plug-and-play (PnP) interconnection architecture for interconnecting a peripheral device with a host computer unit, comprising:

a host-side module installed on the host computer unit; and a peripheral-side module installed on the peripheral device;

wherein the peripheral-side module includes:

a communication interface for linking internal functional modules of the peripheral device to the host computer unit;

an in-device storage unit coupled to the communication interface and at least used for storing data relating to the peripheral device; and a peripheral function unit coupled to the communication interface, for storing data relating to a hardware architecture and firmware for the peripheral device;

and the host-side module includes:

a communication interface linked to the communication interface of the peripheral-side module installed on the peripheral device; and a software platform that supports PnP devices, the software platform being coupled to the communication interface and capable of performing a PnP-compliant auto-configuration procedure and a device-driver setup procedure;

wherein as the peripheral device is linked via the communication interfaces to the host computer unit, the software platform is activated to perform a PnP-compliant auto-configuration procedure to configure the host computer unit for interconnection with the peripheral device; and then, if a device driver of the peripheral device is not installed on the host computer unit, a device-driver setup procedure is performed to download and set up a device driver pre-stored in the in-device storage unit into the host computer unit.

2. The plug-and-play interconnection architecture of claim 1, wherein the peripheral device is selected from the group consisting of image-input device, telecommunication device, external storage device, human interface device (HID), audio input/output device, and printer.

3. The plug-and-play interconnection architecture of claim 1, wherein the communication interface is selected from the group consisting of USB interface, IEEE-1394 interface, PCMCIA interface, CardBus IO interface, Compact Flash interface, Secure Digit IO interface, and Memory Stick IO interface.

4. The plug-and-play interconnection architecture of claim 1, wherein the in-device storage unit is an optical disc selected from the group consisting of CD-ROM, CD-RW, DVD-ROM, DVD-RAM, DVD–RW, and DVD+RW.

5. The plug-and-play interconnection architecture of claim 1, wherein the in-device storage unit is a non-volatile memory module selected from the group consisting of flash memory, EEPROM, EPROM, ROM, SDRAM, and HD.

6. The plug-and-play interconnection architecture of claim 1, wherein in the case of the peripheral device being an external storage device, the in-device storage unit is implemented as a logical partition of the external storage device or a physically separated storage device.

7. A plug-and-play (PnP) interconnection architecture for interconnecting a peripheral device with a host computer unit, each of the peripheral device and host computer unit having a PnP-compliant communication interface composed of a PnP-compliant physical layer, a PnP-compliant logical layer together with an in-device PnP-compliant logical layer and a PnP-compliant function layer together with an in-device PnP-compliant function layer, wherein the host computer unit and the peripheral device are physically interconnected via the PnP-compliant physical layers thereof, the plug-and-play interconnection architecture comprising:

the PnP-compliant logical layer for the host computer unit having a basic PnP data-base for storing the basic device configuration data for PnP-compliant storage devices, whereby the host computer unit determines if the peripheral device connected thereto is a storage device so as to allow the host computer unit to read data stored in the peripheral device; and the in-device PnP-compliant logical layer peripheral device having a storage unit for storing a device configuration data of the peripheral device, wherein the host computer unit determines the peripheral device is a storage device, the peripheral device reads and transfers the device configuration data from the storage unit to the host computer unit for building up a PnP connection in association with the host computer unit.

8. The architecture of claim 7, wherein the PnP-compliant function layer of the peripheral device has a storage unit for storing predetermined function programs and data provided by a manufacturer for the peripheral device; with the device driver of the peripheral device being transferred to the host computer unit, the host computer unit determines the type of peripheral device, and the peripheral device executes predetermined programs stored in the storage unit of the PnP-compliant function layer and transmits the executed results from the PnP-compliant function layer via the PnP-compliant logical and physical layers to the host computer unit.

9. The architecture of claim 7, wherein the storage unit in the PnP-compliant logical layer of the peripheral device further stores predetermined function programs and data provided by a manufacturer for the peripheral device.

10. The architecture of claim 7, wherein the peripheral device is a type of peripheral device selected from the group consisting of image-input device, telecommunication device, external storage device, human interface device (HID), audio input/output device, and printer.

11. The architecture of claim 7, wherein the communication interface is selected from the group consisting of USB interface, IEEE-1394 interface, PCMCIA interface, CardBus IO interface, Compact Flash interface, Secure Digit IO interface, and Memory Stick IO interface.

12. The architecture of claim 7, wherein the in-device storage unit is an optical disc selected from the group consisting of CD-ROM, CD-RW, DVD-ROM, DVD-RAM, DVD–RW, and DVD+RW.

13. The architecture of claim 7, wherein the in-device storage unit is a non-volatile memory module selected from the group consisting of flash memory, EEPROM, EPROM, ROM, SDRAM, and HD.

14. The architecture of claim 7, wherein in the case of the peripheral device being an external storage device, the in-device storage unit is implemented as a logical partition of the external storage device or a physically separated storage device.

15. A method for interconnecting a peripheral device with a host computer unit, the peripheral device being provided an in-device storage unit for storing predetermined device functions including a device driver, wherein each of the peripheral device and host computer unit is formed with a PnP-compliant communication interface; the method in the host computer unit comprising the steps of:

(1) implementing a PnP initialization process via the host computer unit;

(2) determining via the host computer unit if the device driver of the plugged peripheral device is already installed therein; if yes, performing step (5); if no, performing step (3);

(3) activating a device driver installation program stored in the in-device storage unit of the peripheral device to install the device driver for the peripheral device from the in-device storage unit to the host computer unit;

(4) forwarding via the host computer unit an install-complete signal to the peripheral device indicating complete installation of the device driver in the host computer unit;

(5) sending via the host computer unit a driver-exist signal to the peripheral device indicating existence of the device driver through the communication interface; and (6) invoking a device specific software from the in-device storage unit for executing particular or predetermined device specific functions.

16. The method of claim 15, wherein the method is invoked through an AutoPlay or AutoRun mechanism provided by a software platform running on the host computer unit.

17. The method of claim 15, wherein in the step (1), when the peripheral device is plugged into the host computer unit, the peripheral device is in a power-on and initial state and performs an initialization process to set a flag thereof as zero and set a counter thereof as zero; the flag of the peripheral device is alternatively zero or 1 in a manner that, if the flag is 1, it indicates that the device driver for the peripheral device is already installed in the host computer unit; then the peripheral device is subject to a ready state where the peripheral device waits for a signal from the host computer unit.

18. The method of claim 17, wherein when the peripheral device receives a PnP enumerate signal from the host computer unit, if the flag of the peripheral device is zero, the peripheral device replies to the host computer unit a signal indicating the in-device storage unit is an AutoPlay or AutoRun storage unit and sets the counter to be 1; if the flag is 1, the peripheral device replies to the host computer unit a signal indicating the peripheral device being a composite device consisting of a device function unit and the AutoPlay or AutoRun storage unit; then, the peripheral device returns to the ready state.

19. The method of claim 18, wherein the AutoPlay or AutoRun storage unit is supported by the software platform on the host computer unit when the peripheral device is connected with the host computer unit through a PnP interconnection; the AutoPlay or Auto-Run storage unit is selected from the group of storage devices consisting of CD-ROM, CD-RW, DVD-ROM, DVD-RAM, DVD–RW, DVD+RW, hard disk, Memory Stick card, Secure Digital card, Compact Flash card, SmartMedia card, xD-picture card, PCMCIA card and IBM micro drive.

20. The method of claim 17, wherein in the step (4), when the peripheral device receives an install-complete signal from the host computer unit, it sets the flag to be 1 and in turn unplugs and re-plug PnP interconnection with respect to the host computer unit; then, the peripheral device returns to the ready state.

21. The method of claim 17, wherein in the step (5), when the peripheral device receives a driver-exist signal from the host computer unit, it sets the flag to be 1; the peripheral device checks if the counter equals to 1, and then in turn unplugs and replugs the PnP interconnection; afterwards, the peripheral device sets the counter to be zero, and then returns to the ready state.

22. The method of claim 15, wherein the in-device storage unit is an optical disc selected from the group consisting of CD-ROM, CD-RW, DVD-ROM, DVD-RAM, DVD–RW, and DVD+RW.

23. The method of claim 15, wherein the in-device storage unit is a non-volatile memory module selected from the group consisting of flash memory, EEPROM, EPROM, ROM, SDRAM, and HD.

24. The method of claim 15, wherein in the case of the peripheral device being an external storage device, the in-device storage unit is implemented as a logical partition of the external storage device or a physically separated storage device.

* * * * *